(12) United States Patent
Sarigul-Klijn et al.

(10) Patent No.: US 7,458,544 B1
(45) Date of Patent: Dec. 2, 2008

(54) METHOD AND APPARATUS FOR DROPPING A LAUNCH VEHICLE FROM BENEATH AN AIRPLANE

(75) Inventors: Marti Sarigul-Klijn, Dixon, CA (US); Nesrin Sarigul-Klijn, Dixon, CA (US)

(73) Assignee: Airlaunch LLC, Kirkland, WA (US)

( * ) Notice: Subject to any disclaimer, the term of this patent is extended or adjusted under 35 U.S.C. 154(b) by 599 days.

(21) Appl. No.: 11/317,630

(22) Filed: Dec. 23, 2005

(51) Int. Cl.
*B64D 1/12* (2006.01)
(52) U.S. Cl. ............... 244/137.4; 244/137.3; 244/171.4
(58) Field of Classification Search ............ 244/2, 244/171.4, 63, 137.4, 137.3, 158.1
See application file for complete search history.

(56) References Cited

U.S. PATENT DOCUMENTS

| | | | |
|---|---|---|---|
| 4,802,639 | A | 2/1989 | Hardy et al. |
| 4,901,949 | A | 2/1990 | Elias |
| 4,917,526 | A | 4/1990 | Paterson |
| 5,088,663 | A | 2/1992 | Henson |
| 5,456,424 | A * | 10/1995 | Palmer ..................... 244/2 |
| 5,740,985 | A | 4/1998 | Scott et al. |
| 5,907,118 | A | 5/1999 | Jakubowski, Jr. et al. |
| 6,068,211 | A * | 5/2000 | Toliver et al. .............. 244/2 |
| 6,250,195 | B1 | 6/2001 | Mendoza et al. |
| 6,508,435 | B1 | 1/2003 | Karpov et al. |
| 6,622,967 | B2 | 9/2003 | Weelden et al. |
| 6,872,889 | B1 | 3/2005 | Cruttenden et al. |
| 6,926,226 | B2 | 8/2005 | Gathier |

OTHER PUBLICATIONS

"Air Launching Earth-to-Orbit Vehicles: Delta V Gains from Launch Conditions and Vehicle Aerodynamics" by Nesrin Sarigul-Klijn, Christopher Noel and Marti Sarigul-Klijn, 42nd AIAA Aerospace Sciences Meeting and Exhibit, Reno, Nevada, Jan. 5-8, 2004.
"A Study of Air Launch Methods for RLVs" by Nesrin Sarigul-Klijn and Marti Sarigul-Klijn, American Institute of Aeronautics and Astronautics, 2001.
"Flight Testing of a New Air Launch for Safely Launching Personnel and Cargo into Low Earth Orbit", by Marti Sarigul-Klijn, Nesrin Sarigul-Klijn, Bob Margan, Jim Tighe, Arnaldo Leon, Gary Hudson, Bevin McKinney and David Gump, printed from t/Space website: http://www.transformspace.com/document_library/media/AIAA-2006-1040.pdf orginally written on Jun. 16, 2005.

(Continued)

*Primary Examiner*—Timothy D Collins
(74) *Attorney, Agent, or Firm*—Stiennon & Stiennon (57) ABSTRACT

A system for launching a launch vehicles mounted beneath an aircraft. A mechanism which separates the launch vehicle from the carrier aircraft engages the launch vehicle, and prevents the launch vehicle from coming into contact with the carrier aircraft as the launch vehicle is dropped away from the launch vehicle. A lanyard extends from the carrier aircraft applies an impulse to the launch vehicle as it is separated from the aircraft causing the launch vehicle to rotate upwardly of the pitch plane. A drogue parachute applies a rearward force to the launch vehicle holding the rigid trapeze in engagement with the launch vehicle, and damping the rate of rotation in the pitch plane as the rotation of the pitch plane brings a launch vehicle to a substantially vertical launch attitude, were powered flight of launch vehicle is begun. The launch vehicle follows a trajectory that crosses behind the carrier aircraft.

21 Claims, 3 Drawing Sheets

OTHER PUBLICATIONS

"Can a Small Start-up Build America's Next Spaceship?" by Michael Belfiore, originally appeared in Sep. 2005 issue of Popular Science, reprinted from Popular Science website: http://www.popsci.com/popsci/printerfriendly/aviationspace/fdd9d989caf46010vgnvcm1000004eecbccdrcrd.html printed Dec. 6, 2005, 3 pp.

Printout of slide show accompanying Belfiore's Sep. 2005 Popular Science article: http://img.timeinc.net/popsci/images/2005/09/space1005tspace_485xslide1.jpg http://img.timeinc.net/popsci/images/2005/09/space1005tspace_485xslide2.jpg http://img.timeinc.net/popsci/images/2005/09/space1005tspace_485xslide3.jpg http://img.timeinc.net/images/2005/09/space1005tspace_485xslide4.jpg all images printed Dec. 6, 2005, 4 pp.

"Best of What's New 2005: t/Space Crew Transfer Vehicle Smart Shuttle Backup", originally appeared in Nov. 2005 issue of Popular Science, reprinted from Popular Science website: http://www.popsci.com/popsci/bown2005/aviationspace/209f1d15cc827010vgnvcm1000004eecbccdrcrd.html printed Dec. 6, 2005, 2 pp.

\* cited by examiner

METHOD AND APPARATUS FOR DROPPING A LAUNCH VEHICLE FROM BENEATH AN AIRPLANE

STATEMENT AS TO RIGHTS TO INVENTIONS MADE UNDER FEDERALLY SPONSORED RESEARCH AND DEVELOPMENT

This invention was made with Government support under Agreement No. NNT04AA04C awarded by the National Aeronautics and Space Administration. The Government has certain rights in the invention.

CROSS REFERENCES TO RELATED APPLICATIONS

Not applicable.

BACKGROUND OF THE INVENTION

The present invention relates to systems for launching a launch vehicle from an aircraft in general, and to vehicles that are air launched captive-on-bottom from a carrier aircraft, in particular.

Rocket launch vehicles, both with and without crews, have conventionally been launched from ground-based installations near coastal areas. These installations have been fixed launch stands, such as Cape Canaveral, or specialized mobile carriers used for missile launches. Ground launches, however, present problems of launch delays due to inclement weather, the necessity to clear the vicinity of air traffic to avoid collision, and in particular present concerns about the overflight of populated land areas in the flight path of the launch vehicle. Moreover, crew safety equipment for manned vehicles must take into account the requirement to remove the crew from a vehicle in the case of a launch abort or failure which may occur on the ground or very close to the ground.

Some of the problems of ground launching can be overcome by launching the rocket launch vehicle from an aircraft in flight. An air launch offers several advantages over a ground launch, such as the avoidance of weather related delays, the simplification of operations, and increases in safety, both for the crew by simplifying abort options, and for the public because of the ability to avoid the overflight of populated areas. In addition, air launching presents design options that simplify the operation of the launch vehicle engine. In particular, it is known that high area ratio nozzles for a given engine pressure increase performance. Thus if a lower engine pressure is used to take advantage of the high area ratio nozzle, a lower cost solution is possible. A lower pressure engine can be pressured fed which means that no turbo-pumps or gas generators are needed, resulting in a less complex solution. A lower pressure engine is also a safer solution because no operational pressure fed rocket has ever exploded.

There are several methods of air-launching, each with their own pros and cons. One method is captive-on-top, where the launch vehicle is carried on top of the carrier aircraft. While a large launch vehicle can be carried, wings are required for separation from the carrier aircraft, and mating the launch vehicle to the carrier aircraft requires a large mating structure which needs to be available at every staging site from which the carrier aircraft is launched. This method was used for flight trials of the US Space Shuttle. Another method is towed, where a winged launch vehicle is pulled to altitude by the carrier aircraft and then released. This method requires lower cost modifications to the carrier aircraft than the captive-on-top method, but there is the additional hazard of a broken towline, and the towed launch vehicle must have wings sized for takeoff. Another method is aerial refueled launching, where the launch vehicle takes off with a smaller and lighter weight propellant load and then is refueled at altitude to continue with the mission. Wings are still required in this approach, although they can be smaller than for a towed vehicle. An example of this would be the SR-71 high-altitude reconnaissance aircraft. Another method is the rockoon, where the launch vehicle is brought to altitude with a balloon. This method, however, must have a calm day for launch and there is greater hazard to objects on the ground from the falling balloon after the release of the launch vehicle. A final method is to carry the launch vehicle either internally or captive-on-bottom of the carrier aircraft. Whether carried inside or underneath, there are limits to the size of the launch vehicle that can be carried. However, an increased launch altitude is possible along with the reduction or elimination of the wings on the launch vehicle. The internal carry approach additionally has a more complicated release mechanism in order to extract the launch vehicle from the carrier aircraft. The air launched, captive-on-bottom vehicle offers a good compromise between vehicle size, payload amount and operational complexity. Examples of air launched, captive-on-bottom vehicles include the Pegasus vehicle developed by Orbital Sciences Corporation, and the SpaceShipOne vehicle developed by Scaled Composites.

While existing air-launched, captive-on-bottom vehicles use different types of carrier aircraft, such as commercial jet, military bomber or custom designed airplane, each of these launch vehicles employs a forward trajectory that carries it in front of its carrier aircraft. Typically during an air launch, a launch vehicle will drop below the carrier aircraft and then re-cross the carrier aircraft's altitude in front of it. Vehicles such as the X-15, the Pegasus rocket, and SpaceShipOne have used this forward crossing trajectory. These vehicles must use wings in order to transition from the horizontal to vertical orientation.

Using wings subjects these vehicles to large longitudinal bending stress during the 2-3 g pull-up maneuver they must do as they transition from horizontal to vertical flight. This high sideways acceleration requires a stronger and heavier fuselage structure. Another disadvantage of the use of wings is the need for greater peak first stage engine thrust vectoring control. This engine thrust vectoring assists in the change of orientation, horizontal to vertical, of the launch vehicle, and helps to maintain stability during this orientation transition.

Because of the additional systems often required with the use of wings, such as control surface actuators, auxiliary power units, and thermal protection, a common design goal is to reduce or eliminate the wings. However, forward crossing trajectories, for launch vehicles without wings, require flight at large angles of attack during the transition from horizontal to vertical flight. This transition segment is a high dynamic pressure segment of the trajectory, which results in large angles of attack at peak dynamic pressures. This additional load requires a stronger fuselage structure, thereby increasing the weight of the launch vehicle and offsetting the weight savings by eliminating the wings in the first place.

Lastly, there is the safety concern during a forward crossing air launch, though minimized through careful planning, of the possibility of falling debris from the launch vehicle hitting the carrier craft, either accidentally or as a result of the launch system's operation.

What is needed is an air launch system that has the advantages of air launching, captive-on-bottom without the negative aspects of a forward-crossing trajectory.

SUMMARY OF THE INVENTION

The present invention is an apparatus and method for launching a launch vehicle from a carrier aircraft. The launch vehicle is air-launched from a position of being carried captive-on-bottom of the carrier aircraft. The vehicle transitions from a horizontal orientation underneath the carrier aircraft, to a substantially vertical orientation of the launch vehicle, behind and below the carrier aircraft. When the launch vehicle has achieved substantial vertical orientation below and behind the carrier aircraft, the launch vehicle's engine is ignited.

The launch vehicle is attached beneath the carrier aircraft to a pylon in a conventional manner such as used in a bomb rack. A rigid member is hingedly mounted below the center of gravity of the carrier aircraft and extends to a portion of the launch vehicle forward of the launch vehicle center of gravity (CG). The rigid member is a rigid trapeze which is hinged to the carrier aircraft and engages a spindle on the launch vehicle which allows the trapeze to rotate with respect to the launch vehicle. The spindles do not attach the launch vehicle to the trapeze, but the dynamics of the separation of the launch vehicle from the carrier aircraft constrains the trapeze to engage the spindles for a short period of time which constrains the launch vehicle in its initial motion away from the carrier aircraft. The spindles on the launch vehicle engage the spaced apart U-shaped slots formed by portions of the trapeze. As gravity pulls the CG of the launch vehicle downwardly away from the carrier craft, a drogue parachute produces aerodynamic drag on the launch vehicle, pulling the vehicle in a rearward direction with respect to the carrier aircraft. The drag forces on the launch vehicle pull the spindles mounted to the launch vehicle rearwardly into engagement with the bottom of the U-shaped slots on the trapeze. When the launch vehicle is released from the carrier aircraft pylon, the rigid trapeze swings downward and rearward, constraining the motion of the launch vehicle so that the launch vehicle nose does not rotate upward and collide with the carrier aircraft. An aircraft in flight has a negative pressures zone which applies a uniform upward force on a launch vehicle carried beneath the aircraft. On the other hand, a launch vehicle center of gravity will typically be located rearwardly of the center of area of the upper portion of the launch vehicle. The net result is that the negative pressures on the launch vehicle can cause the forces on the launch vehicle forward of the CG to be greater than the forces produced by negative pressure on the rearward portion, because the rearward portion has less area. The result of this negative pressure imbalance is that the vehicle will begin to rotate as it falls away from the carrier aircraft with the possibility that the forward portion will impact the carrier aircraft. The trapeze structure thus controls the motion of the launch vehicle as it falls away from the carrier aircraft until it is clear of the aerodynamic effects of the carrier aircraft.

However, the rotation of the launch vehicle which is prevented by the trapeze is the very rotation which is desirable to cause the launch vehicle to rotate to a vertical position to begin its powered flight trajectory to orbit. To cause the desired rotation of the vehicle to a vertical attitude, a flexible line or lanyard, which has one end attached to a braking mechanism, is mounted to the carrier aircraft, and the other end of the lanyard is connected to a bracket on the launch vehicle between the spindles which engage the trapeze. The lanyard passes to a brake on the carrier aircraft which is located below the aircraft center of gravity. Having the lanyard pass to a point below the center of gravity of the carrier aircraft minimizes pitching of the carrier aircraft due to the lanyard load on the brake. The lanyard, while connected to the launch vehicle, will pull upwardly on the bracket which is mounted forward of the CG of the launch vehicle causing the launch vehicle to rotate. The rotation of the launch vehicle as it falls away from the carrier aircraft causes the launch vehicle to move from a horizontal orientation toward a vertical orientation. The rate of rotation, and thus the speed at which the transition to vertical occurs, as the total impulse applied by the lanyard increases i.e., as force×time increases. The length of time of the upward pull is increased with the length of the lanyard and force is increased by the amount of tension applied by the braking device. At least one end of the lanyard is releaseable to allow the launch vehicle to separate from the carrier aircraft. The lanyard may also be designed to give way if the tension on the lanyard exceeds a selected load, by the choice of the breaking tension of the lanyard.

The drogue parachute which is attached to the rear of the launch vehicle has two main functions in addition to constraining the spindle to the U-shaped slots on the trapeze by producing a rearward force. First it stabilizes the launch vehicle in yaw as it begins to drop down and rearward of the carrier aircraft. Secondly, it is used to progressively reduce the rate of rotation as the launch vehicle moves from a horizontal to a vertical orientation. When the launch vehicle is near the vertical orientation, rotation of the launch vehicle has been substantially reduced by the drogue parachute and the vehicle's rocket engine is ignited. The drogue parachute is then separated from the launch vehicle, and the vehicle begin its powered flight into orbit. By controlling the rate of rotation by adjusting the braking force and length of the lanyard, the distance of the launch vehicle from the carrier aircraft when the launch vehicle reaches a vertical orientation can be controlled. The slower the launch vehicle rotates, the more time that is required for the vehicle to rotate to the vertical orientation.

It is an object of the present invention to provide an apparatus and method for releasing a launch vehicle from a carrier aircraft, wherein the launch vehicle is guided away from the aircraft and is induced to rotate in the pitch plane of the launch vehicle.

It is a further object to the present invention to provide an apparatus and method of air dropping a launch vehicle from beneath a carrier aircraft where wings are not used to orient the vehicle.

It is another object of the present invention to provide an apparatus and method of air dropping a launch vehicle from beneath a carrier aircraft where loads applied to the launch vehicle are minimized.

It is yet another object of the present invention to provide an apparatus and method for increasing the safety of the carrier aircraft after the release of a launch vehicle.

Further objects, features and advantages of the invention will be apparent from the following detailed description when taken in conjunction with the accompanying drawings.

DESCRIPTION OF THE PREFERRED EMBODIMENTS

Figure 1:
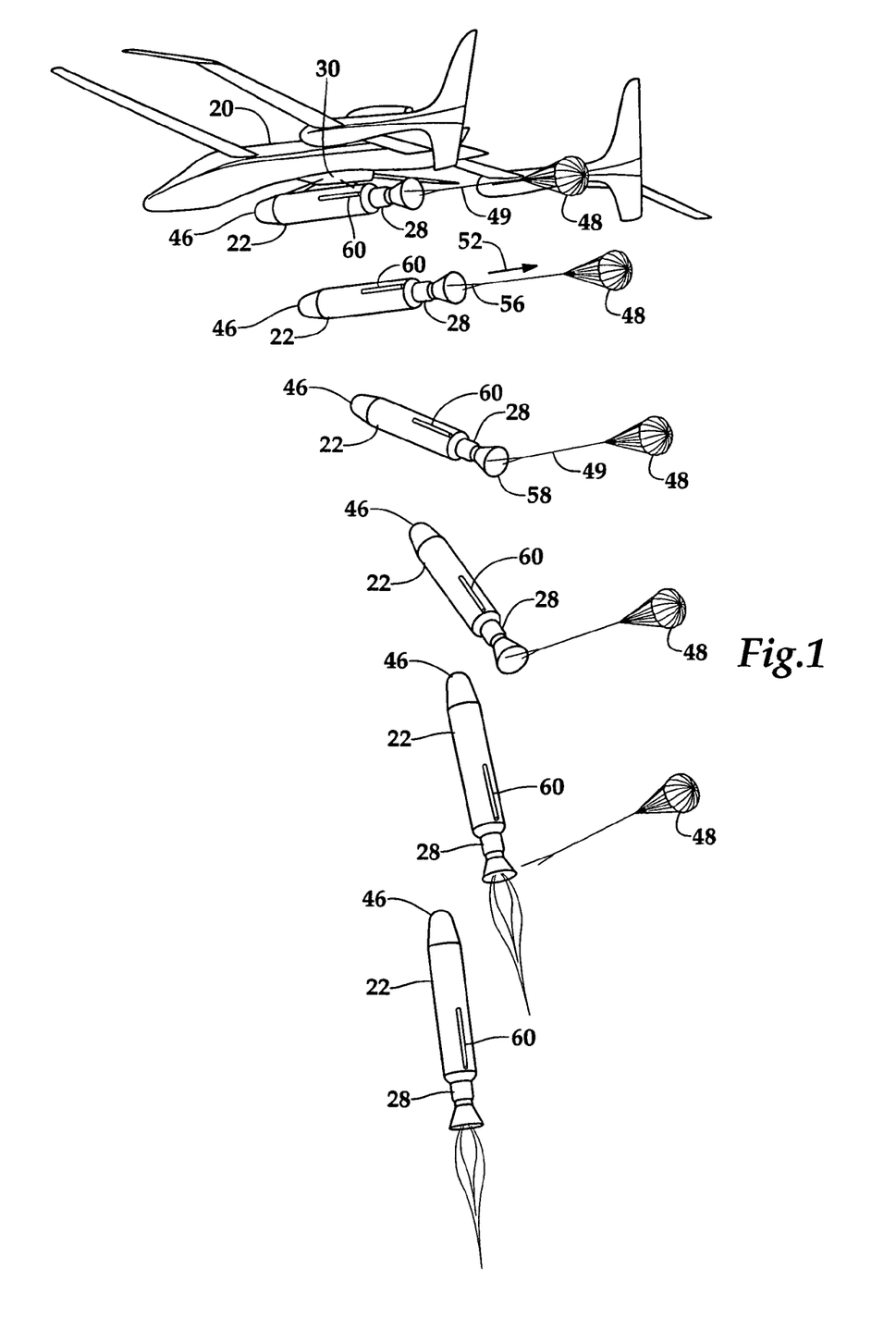
FIG. 1 is a fragmentary side perspective view of the carrier aircraft of this invention showing the launch vehicle being released from the carrier aircraft and transitioning from a horizontal orientation to a vertical orientation.
Figure 2:
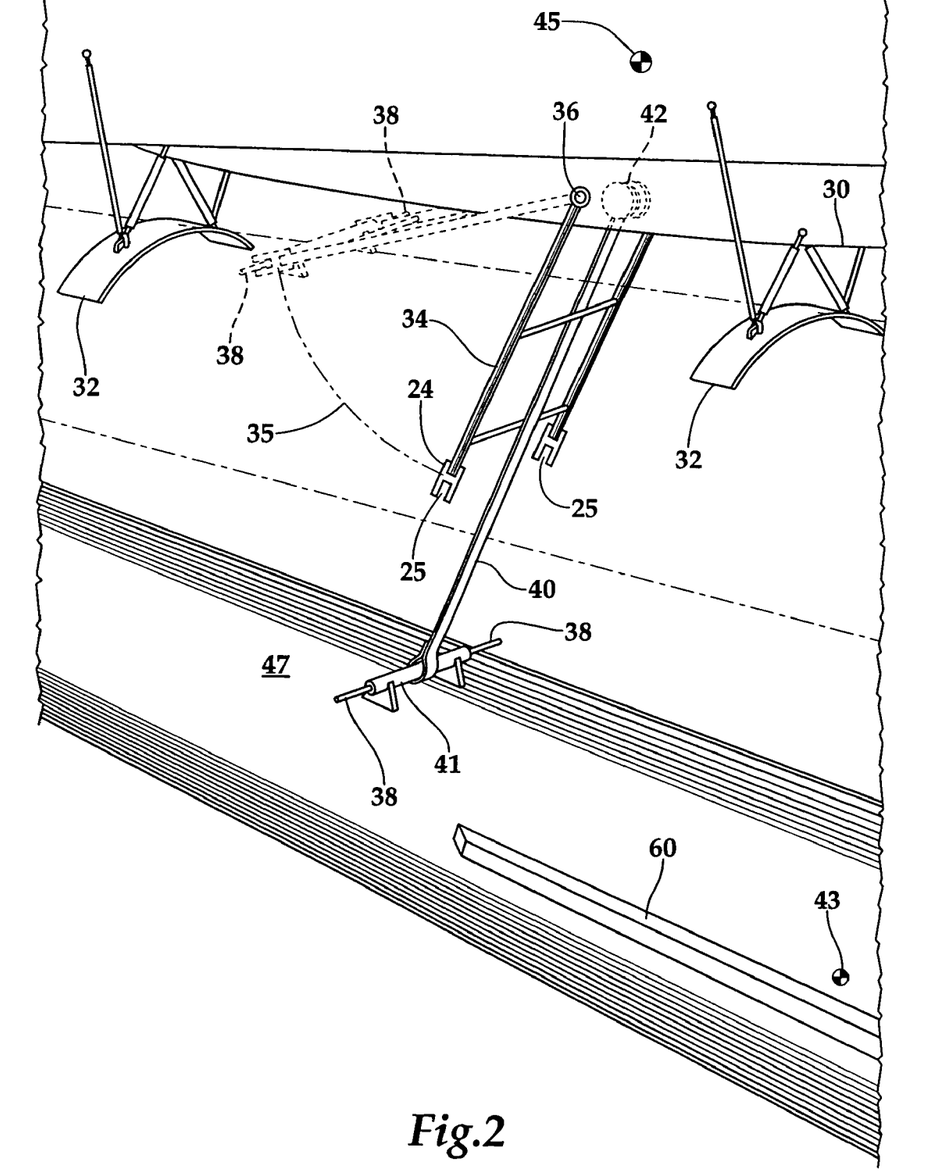
FIG. 2 is an enlarged fragmentary perspective view of the mechanism used to control the separation between the launch vehicle and carrier aircraft of FIG. 1.
Figure 3:
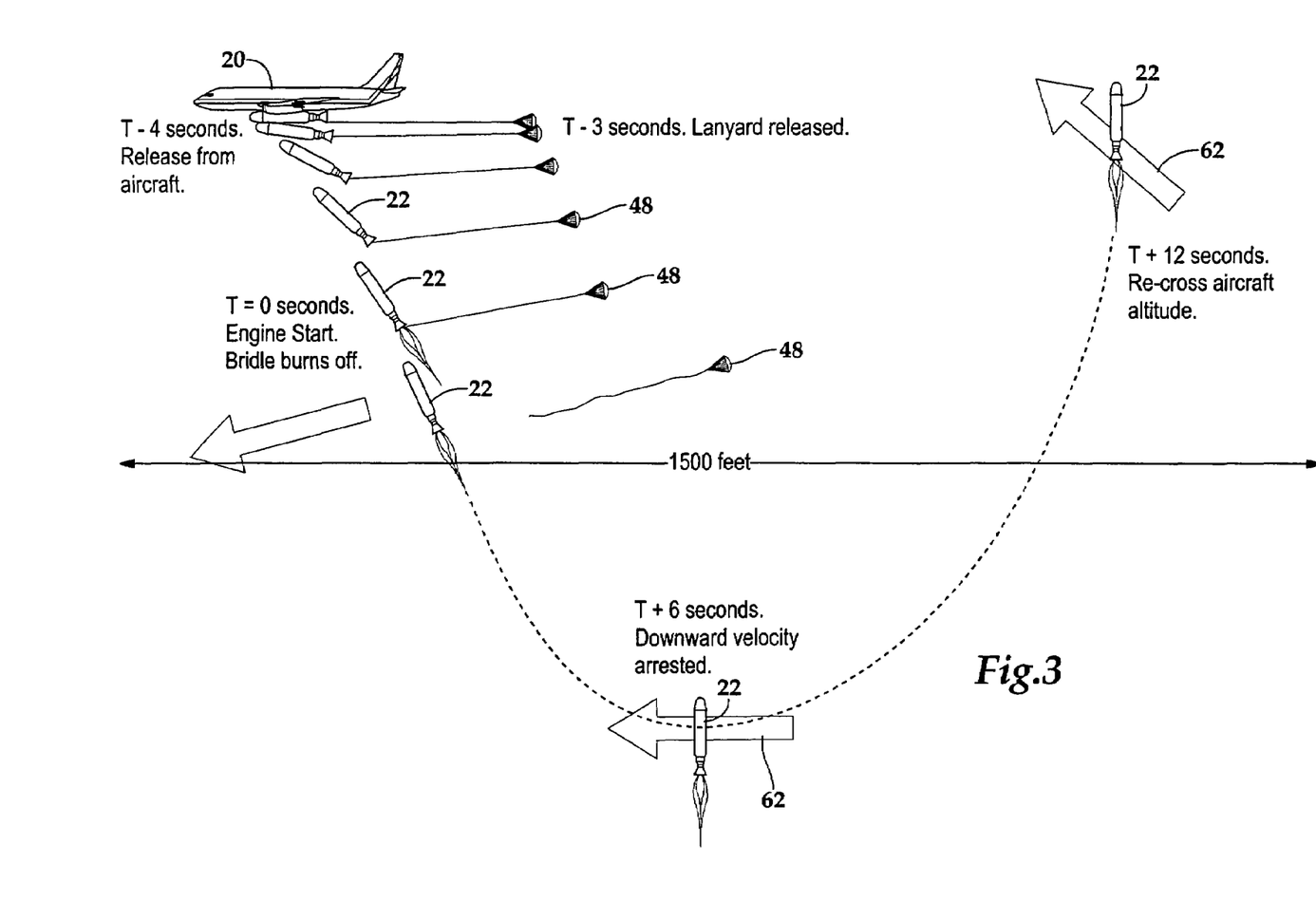
FIG. 3 is a schematic view of the launch vehicle of FIG. 1 being dropped and launched.

Referring more particularly to FIGS. 1-3, wherein like numbers refer to similar parts, a launch vehicle 22 is shown carried underneath a carrier aircraft 20. The description, and illustrations are based in part on a drop test article, i.e., the launch vehicle 20 which was used to prove out the concept of the design. The, the launch vehicle 20 drop test article, is a 23 percent scale test article, weighing about 2,000 lb. A preferred embodiment launch vehicle 22 shown in FIG. 3 is a 100 percent scale compared to the drop test article's 23 percent scale, and has a launch weight of more than 300,000 lb, i.e., about 9,000 slugs mass, and could be carried by a Boeing 747 aircraft. Three drop test were preformed with the 23 percent scale launch vehicle 22.

The launch vehicle 22 was mounted to the carrier aircraft 20 by a release mechanism (not shown) forming part of a bomb rack (not shown) mounted to the carrier aircraft and carried within a pylon 30 extending from the bottom of the carrier aircraft 20. The release mechanism was of a type common to those used in bomb racks and missile racks to hold missiles in weapon systems on fighter aircraft e.g., a F-4 Phantom fighter bomb rack modified to operate on a pneumatic air source, with the ejector foot capped off so its function was inhibited. When the release mechanism is activated, the launch vehicle 22 is free to fall away from the carrier aircraft 20. The bomb rack incorporates adjustable sway bolts (not shown), which engage the sides of the launch vehicle in a transverse direction on either side of a release mechanism, see for example the mechanisms disclosed in U.S. Pat. Nos. 3,967,528 and 4,102,520 which are incorporated by reference herein. To augment the adjustable sway bolts, additional support structures 32 which are spaced further apart longitudinally along the launch vehicle engaged the vehicle and constrained it against lateral motion, while at the same time allowing the launch vehicle 22 to drop free of the carrier aircraft 20.

A typical bomb rack as used to drop a weapon performs two functions: release of the weapon from attachment to the aircraft, and pushing the weapon away from the aircraft at about 20 ft/sec, and out of a region of low pressure which normally attaches to the underside of an aircraft. The pushing out of the region of low pressure is normally performed with a hydraulic or pneumatic ram which pushes the weapon away from the aircraft with a force of at least several times the acceleration due to gravity. Such launch accelerations are not practical for launch vehicles because providing the strength and stiffness necessary to accommodate such loads would make the launch vehicle impractically heavy. Moreover, the launch vehicle might weigh nearly as much as the carrier aircraft, and thus equivalent loads would be applied to the carrier aircraft requiring an impractical level of strengthening of the aircraft. In addition to the foregoing functions, control of the dynamics at release are required to be such as to bring the launch vehicle 22 to a vertical orientation, to begin its powered flight into orbit.

The invention will be discussed initially in the context of a test body and a small carrier, however, the modifications which will be present to accommodate a full scale orbital launch vehicle and larger carrier aircraft will be discussed below.

Control of the dynamics of the separation of the launch vehicle 22 from the carrier aircraft 20 is achieved using three structures. The first structure is a trapeze 34 attached to the pylon 30 by a hinge 36 about which the trapeze 34 may rotate freely. On the opposite end of the trapeze 34 from the hinge 36, the trapeze 34 has brackets 24, with U-shaped slots 25 that are in sliding engagement with spindles 38 affixed to the launch vehicle 22 as shown in FIG. 2. The U-shaped brackets 24 allow the launch vehicle 22 to rotate with respect to the trapeze 34. The spindles 38 form the structure through which the trapeze 34 reacts against the launch vehicle 22 as the launch vehicle falls away from the carrier aircraft 20. The second structure is a drogue parachute 48 attached to the engine bell 58 at the engine end of the launch vehicle 22. The drogue chute 48 is deployed before release of the launch vehicle and applies a rearward drag force 52 to the launch vehicle 22. The third structure is a lanyard 40 which is connected to the launch vehicle at a lanyard bracket 41 which may be a rod extending between the spindles 38 and spaced from the surface of the launch vehicle by rigid ears. The lanyard 40 extends to a brake 42 mounted within the pylon 30 to the carrier aircraft 20. The brake 42 used in the test flights was a motorcycle rear wheel hub which was braked by internal brake shoes. The axle of the hub was fixed and the lanyard was wound around the hub. Tension on the brake cable of the motorcycle rear wheel hub was set by a spring to produce a tension of 200 to 300 pounds on the lanyard 40 as it was unwound from the hub. The spindles 38 and the lanyard bracket 41 are coincidental and forward of the center of gravity (CG) 43 of the launch vehicle 22, and the brake 42 and the trapeze 34 are attached at approximately the center of gravity (CG) 45 of the aircraft to minimize pitching of the aircraft when the launch vehicle 22 is released.

In order to separate the launch vehicle 22 from the carrier aircraft 20 without impacting the aircraft, and to give the launch vehicle a rotation in the pitch plane which will bring the vehicle, as it falls away from the carrier aircraft, to a controlled attitude of 60° to 90° from the horizontal, the three structures, the trapeze 34, the lanyard 40, and the drogue chute 48 are used together. The three structures function together to control the dynamic motion of the launch vehicle as it is released from the carrier aircraft 20 and the vehicle 22 rotates into a launch attitude as the vehicle falls away from the carrier aircraft 20.

When it is desired to launch the launch vehicle 22, the release mechanism, not shown, is actuated to release the rigid connection of the launch vehicle to the carrier aircraft. As the launch vehicles falls away from the carrier aircraft, the trapeze 34 and the drogue chute 48 interact to prevent the nose end 46 of the launch vehicle 22 from coming into contact with the carrier aircraft 20 as shown in FIG. 3. The drogue chute 48 applies tension through a riser line 49 which is attached to the engine bell 58 on the launch vehicle 22. After the launch vehicle 22 is released from the carrier craft 20, the drogue chute 48 pulls the launch vehicle 22 rearwardly urging the spindles 38 into the U-shaped slots 25 of the brackets 24 of the trapeze 34. With the launch vehicle 22 thus engaged with the trapeze structure 34, its forward portions 47, to which the spindles are attached, are constrained to follow a circular path 35 as the gravitational force acts downwardly on the center of gravity 43 of the launch vehicle and the drogue chute 48 continues to apply a rearward force to the launch vehicle.

As the launch vehicle falls away from the carrier aircraft, the force of the drogue parachute retains the launch vehicle spindles engaged with the trapeze as it pivots downwardly beneath the carrier aircraft. Once the trapeze has pivoted sufficiently, the spindles fall out of engagement with the trapeze brackets 24, and the trapeze then ceases to influence the motion of the launch vehicle. The trapeze 34 thus initially stabilizes and guides the launch vehicle 22 away from the carrier aircraft 20 forcing a slight nose down pitch rate, as it constrains the spindles 38, and thus the forward portions 47 of the launch vehicle to which the spindles 38 are mounted, to follow the arc of the path 35. The arrangement of the trapeze 34 thus ensures that the launch vehicle 22 cannot impact the carrier aircraft as it clears the near-field aerodynamic effects of the carrier aircraft 20. The trapeze 34 also nulls out any launch vehicle 22 yaw or roll motions at separation release from the carrier aircraft 20.

After the vehicle falls away from the trapeze, the lanyard 40 imparts a pitch-up rotation to the launch vehicle. The flexible lanyard 40 is fixed at one end to the lanyard bracket 41 on the launch vehicle, and is routed from the bracket 41 along the inside of the trapeze 34 to the braking device 42 mounted in the pylon 30 on the axis of rotation of the trapeze hinge 36. The brake 42 has a spool about which the lanyard is wound. As the launch vehicle 22 falls clear of the trapeze 34, as shown in FIG. 2, the lanyard 40 unwinds from a spool forming part of the brake 42 under a preselected tension, in the case of the drop tests this tension amounted to between 200 and 350 pounds force. The tension of the strap over the time during which the strap is drawn from the brake 42 imposes an impulse i.e., force×time, to the launch vehicle 22. Because the impulse is applied at the bracket 41 between the spindles 38, which are forward of the CG 43 of the launch vehicle, the impulse causes the launch vehicle to rotate in a vertical pitch plane which contains the axis defined by the cylindrical body of the launch vehicle 22. When the lanyard is released from the brake 42 the launch vehicle continues to rotate bring the vehicle towards the vertical. At the same time the tension produced by the drogue on the riser line 49, while remaining substantially constant in magnitude, has an increasing moment arm as the vehicle continues to rotate in the pitch plane, thus increasing the damping effect on the pitch rate. The increasing damping effect is caused by the increasing length of the moment arm through which force applied by the drogue acts, thus producing an increasing torque which reduces and overcomes the initial pitch-up rate of the launch vehicle. The initial pitch-up rate can be controlled by varying the length or the tension in the lanyard so that the launch vehicle reaches maximum vertical attitude after the article has fallen for a time and to a distance such that the vehicle is separated from the carrier aircraft by a selected amount. When the launch vehicle is at or near its maximum vertical attitude the vehicle engine 28 is ignited, burning through the riser line 49 and releasing the drogue chute 48 as the launch vehicle 22 begins its powered flight trajectory to orbit.

The launch vehicle 22 has two aerodynamic chines 60 which extend axially along the cylindrical body of the launch vehicle and which project radially therefrom. The chines 60 are spaced apart circumferentially by approximately 90 degrees and are arranged to make the vehicle 22 weakly aerodynamically stable as the vehicle moves with its long dimension substantially perpendicular to the local air-flow, i.e., at a high angle of attack. The aerodynamic chines 60 also serve to dampen the roll about the axis of the launch vehicle.

While the launch vehicle 22 changes in orientation from horizontal to vertical, it also travels downward and behind the carrier aircraft 20, which continues in flight, as shown in FIG. 3. At T–0 seconds the engine is ignited and burns through the parachute risers 49, releasing the parachute 48. The engine then comes up to full thrust and stops the downward descent of the vehicle at T+6 seconds. At T+12 seconds the launch vehicle 22 crosses the altitude of the carrier aircraft 20 behind and separated from carrier aircraft of more than 1000 feet. At this point, the launch vehicle 22 transitions to a standard gravity turn trajectory to low-earth orbit. The horizontal velocity vector is about 600 fps when the launch vehicle 22 is dropped from a carrier aircraft such as a modified 747 and provides a benefit in reduced velocity necessary to achieve orbit and thus allowing greater payload. The launch vehicle 22 retains a substantial portion of the carrier aircraft's velocity, as illustrated by the horizontal component of the velocity vectors 62 in FIG. 3. Separation of the launch vehicle form the carrier aircraft can be maximized by turning the carrier aircraft away from the flight path of the launch vehicle as soon as the launch vehicle is completely free of the carrier aircraft.

A comparison of the results obtained from the scale drop test article, shown in FIGS. 1 and 2, to expected functionality of a full-scale launch vehicle of FIG. 3 involves a consideration of scaling factors. Moment of inertia for the drop test article 22 is more than 1800 times smaller than a full-scale launch vehicle 22. Very small momentums or torques can easily turn the drop test article 22 because of the smaller moment of inertia and also because the ballistic coefficient i.e., mass divided by drag area, of the drop test article 22 is only 13 percent of that of the full-scale booster. A low ballistic cross-section means that the drop test article 22 is much more susceptible to aerodynamic effects as compared to the full-scale booster 22. A low ballistic cross-section also means that the sideways accelerations experienced by the drop test article are much higher than the sideways accelerations that the full scale vehicle would experience. In any event, sideways accelerations imposed on the drop test article 22 were observed to be very small. Reynolds Number (Re) is a ratio that portrays the relative magnitudes of dynamic forces and viscous forces. Re increases with an object's size and velocity, but decreases with altitude. When Re is low, viscous or friction forces predominate; when Re is high, dynamic and inertia forces predominate. The drop test article's Re was low, as compared to a full scale booster, and therefore the drop test article should be more susceptible to aerodynamic effects than the full-scale booster. The combination of low mass moment of inertia, low ballistic coefficient, and low Re which are characteristic of the drop test article gives a performance which can be analogized to the effect of throwing a piece of balsa wood out the window of a speeding car, while the full scale launch vehicle's performance is like throwing a brick out the window of the speeding car. The bottom line is that the success of the drop test article dynamics means that the same pitch up dynamics will work even better for the full-scale launch vehicle.

Launch speed for the drop test article 22 from the carrier was less than 200 feet per second (fps), compared to about 600 fps for a full-scale vehicle which could be provided by a modified 747 carrier aircraft. Based on a simple calculation it is apparent that 2.6 seconds after separation from the carrier aircraft the drop test article's flight path vector is almost 25 degrees below the horizon for the drop test article, i.e., arcsin (32.2 ft/sec$^2$×2.6 sec)/200 fps). For the airdrop method of this invention maximum pitch-up angle at chute release should be limited so that angle of attack with respect to the apparent wind caused by motion of the vehicle through the air does not substantially exceed 90 degrees, otherwise the parachute will destabilize the booster. Thus for a level carrier aircraft launch at 200 fps, the maximum drop test article pitch-up should be limited to less than 65 degrees above the horizon. On the other hand for the full-scale booster—even with a longer time of fall so as to provide greater clearance from the carrier aircraft—the pitch angle can be greater than 75 degrees up to 80 degrees and if, launching from a carrier aircraft while the aircraft performs a steep pull up the vehicles's pitch angle to be increased to the pure vertical without fear that the launch vehicles's angle of attack will exceed 90 degrees.

For the drop test article the drogue chute 48 compensating force was higher than needed, and so the lanyard tension was set relatively high to establish an initial pitch-up rate of about 40 degrees per second. In the full launch vehicle initial pitch rates may be as low as about 10 degrees per second. The separation between the carrier aircraft and the drop test article was 110 feet as the drop test article reached its maximum pitch attitude, at the simulated booster engine start point. The drop test article's pitch up rate was thus greater than that which would be used for a full-scale booster since more separation between the booster and carrier aircraft would be desirable at engine start. Both the trapeze and the lanyard have scaling issues. The trapeze 34 disengages from the spindles 38 mounted to the launch vehicle 22 at an angle of 30 to 40 degrees of trapeze rotation. For the 23 percent scale drop test article, this occurs after about 2 ft of separation from the carrier aircraft at a downward velocity of about 10 fps relative to the carrier aircraft. For the full scale booster, the trapeze would disengage after about 8 ft of fall at about 20 fps downward relative velocity. Hence the trapeze will provide greater stabilization to the full scale booster. The 23 percent scale drop test article's lanyard was wound around an off-the-shelf motorcycle wheel hub, which contained an internal brake which produced a relatively high force of 200 to 350 lbf with the off-the-shelf unit. To get the desired test article pitch up rate, the lanyard length had to be limited to between 6 to 11 feet. For the full scale rocket, a much longer lanyard would be used—on the order of 50 to 100 feet—to minimize the size of the lanyard brake. The longer lanyard would also provide greater yaw and roll stabilization to the full scale booster. Roll, yaw, and pitch describe rotation of an vehicle about mutually perpendicular axes. Roll is defined about an axes on the longest center line of a vehicle, yaw is defined as rotation in a plane containing the roll axis and which is horizontal in level flight, and pitch is rotation in a plane containing the roll axis and which is vertical in level flight.

It should be understood that a launch vehicle is defined as a vehicle of one or more stages wherein a portion of the launch vehicle i.e., the payload, reaches a controlled velocity above the sensible atmosphere of greater than about 22,000 ft/sec preferably equal to or greater than earth orbital velocity i.e., about 25,000 ft/sec.

It should be understood that the drag forces applied to the launch vehicle 22 by the drogue chute 48 could be supplied by other aerodynamic drag devices such as extendable flaps, an oversized engine nozzle, or other type of aerodynamic decelerator. Moreover, when the launch vehicle is described as substantially without lifting surfaces i.e., wingless, it should be understood to mean a L\D of less than about 0.5.

It should be understood that the method and apparatus for dropping a launch vehicle from beneath an airplane could be employed with any launch vehicle, and in particular with a wingless pressure fed two stage launch vehicle such as shown in U.S. application Ser. No. 11/280,494, filed Nov. 16, 2005, which is incorporated by reference herein.

It is understood that the invention is not limited to the particular construction and arrangement of parts herein illustrated and described, but embraces all such modified forms thereof as come within the scope of the following claims.

What is claimed is:

1. An arrangement for launching a payload into space, comprising:
   a carrier aircraft;
   a launch vehicle, having a nose end and an engine end and a center of gravity therebetween, the launch vehicle having a first forward portion and a second forward portion, each positioned between the center of gravity and the nose end of the launch vehicle, wherein the launch vehicle releasably mounted underneath the carrier aircraft;
   a first member, having a first end hingedly mounted to the carrier aircraft, and a second end in contact with the first forward portion of the launch vehicle, wherein the first member is of a selected length chosen to constrain the first forward portion of launch vehicle to move along an arced path away from the carrier aircraft so that the nose end of the launch vehicle is prevented from rotating upward when the launch vehicle is released from the carrier aircraft while the first member is in contact with the first forward portion of the launch vehicle;
   a brake mounted to the carrier aircraft;
   a second member having a portion in braking engagement with the brake and an end mounted in impulse applying relation to the second forward portion of the launch vehicle, the second member being extensible from the brake for a selected length, the brake engaging the second member so as to apply a braking force to the second member as it is extended from the brake;
   a deployable aerodynamic drag device, mounted to the launch vehicle rearward of the center of gravity.

2. The arrangement of claim 1 wherein the second member is a flexible lanyard which has a portion which is wrapped about a hub and wherein the brake is arranged to apply a braking force which resists rotation of the hub.

3. The arrangement of claim 1 wherein the second end of the first member has portions defining a U-shaped slot which engages with a bracket mounted on the first forward portion of the launch vehicle.

4. The arrangement of claim 3 wherein the second end of the first member has portions defining two spaced apart U-shaped slots which engage with a pair of spindles mounted on the first forward portion of the launch vehicle.

5. The arrangement of claim 1 wherein the first forward portion of the launch vehicle and the second forward portion of the launch vehicle are substantially coincidental.

6. The arrangement of claim 1 wherein the deployable aerodynamic drag device is a parachute mounted to the engine end of the launch vehicle.

7. The arrangement of claim 1 wherein the launch vehicle has mounted thereto aerodynamic chines arranged so that the launch vehicle is substantially aerodynamically neutrally stable at an angle of attack approaching 900.

8. The arrangement of claim 1 wherein the carrier aircraft defines a carrier aircraft center of gravity, and wherein the brake and the first member are located substantially beneath the carrier aircraft center of gravity.

9. A method of deploying a launch vehicle from beneath a carrier aircraft, the carrier aircraft having a direction of flight defining a forward direction in the direction of flight and a rearward direction opposite the direction of flight, the method comprising the steps of:
   carrying the launch vehicle with the carrier aircraft to a selected launch altitude;
   deploying an aerodynamic drag device connected to a rearward portion of the launch vehicle, and applying a rearward force to the launch vehicle with the aerodynamic drag device;
   releasing the launch vehicle from the carrier aircraft so that gravity causes a constantly increasing separation between the launch vehicle and the carrier aircraft;
   first constraining the launch vehicle, as the launch vehicle falls away from the carrier aircraft with the actuation of a first mechanism, so that the launch vehicle can not pitch up into contact with the carrier aircraft;

following the actuation of the first mechanism, actuating a second mechanism to apply a selected impulse to the launch vehicle to cause the launch vehicle to pitch upwardly at a selected rate of rotation in a pitch plane defined by the carrier aircraft;

following actuating the second mechanism, separating all mechanical connections to the carrier aircraft so that the launch vehicle and the drag device continue to fall away from the carrier aircraft;

substantially reducing the selected rate of rotation in the pitch plane by the action of the aerodynamic drag device; and allowing the launch vehicle to rotate to a selected pitch angle and igniting an engine mounted to the launch vehicle, separating the aerodynamic drag device from the launch vehicle and beginning a controlled flight trajectory with the launch vehicle.

10. The method of claim 9 wherein the actuation of the first mechanism further comprises using a pivoting link between the carrier aircraft and the launch vehicle to constrain the motion of the launch vehicle as it falls away from the carrier aircraft so that the launch vehicle cannot come into contact with the carrier aircraft.

11. The method of claim 9 wherein the second mechanism actuation further comprises the steps of: pulling upwardly on a forward portion of the launch vehicle with a lanyard which is pulled from a brake at a selected tension until the lanyard has reached a length selected, defining a time so that the selected tension multiplied by time produces the selected impulse.

12. The method of claim 9 wherein the selected pitch angle measured from a horizontal plane is greater than about 60°.

13. The method of claim 9 wherein the selected pitch angle measured from a horizontal plane is greater than about 75°.

14. The method of claim 9 wherein the selected rate of rotation is between about 40° per second and about 10 degrees per second.

15. The method of claim 9 wherein the drag device is separated by burning through a line connecting the drag device to the engine following igniting of the engine.

16. The method of claim 9 wherein a portion of the launch vehicle is injected into Earth orbit.

17. The method of claim 9 wherein following engine ignition controlling the launch vehicle so that when the launch vehicle and the carrier aircraft have the same altitude, the launch vehicle is rearward of the carrier aircraft.

18. The method of claim 17 wherein the step of controlling the launch vehicle include controlling the launch so that when vehicle and the carrier aircraft have the same altitude the launch vehicle and the carrier aircraft are separated by more than 1000 feet.

19. An apparatus for deploying a launch vehicle from beneath a carrier aircraft, the carrier aircraft having a direction of flight, the carrier aircraft defining a forward direction in the direction of flight and a rearward direction opposite the direction of flight, comprising:

the launch vehicle substantially without lifting surfaces and having a mass greater than about 9,000 slugs releasably mounted beneath the carrier aircraft for carry to a selected launch altitude;

a first mechanical linkage arranged to constrain the launch vehicle over a first selected distance from the carrier aircraft so that the launch vehicle can not pitch up into contact with the carrier aircraft, and the first mechanical linkage arranged to release the launch vehicle, at the first selected distance;

a second mechanical linkage creating a releasable connection between the launch vehicle and the carrier aircraft when the carrier aircraft is spaced more than the first selected distance and less than a second selected distance from the carrier aircraft, the second mechanical linkage arranged to apply a selected tension through the connection to the launch vehicle, as the launch vehicle moves to the second selected distance, wherein at a distance greater than the second selected distance the launch vehicle is not connected to the carrier aircraft as the launch vehicle falls away from the carrier aircraft.

20. The apparatus of claim 19 further comprising a deployable and releasable aerodynamic drag device connected to a rearward portion of the launch vehicle, and arranged so that after deployment the deployable aerodynamic drag device applies a rearward force to the launch vehicle, until the aerodynamic drag device is released.

21. The apparatus of claim 20 wherein the deployable and releasable aerodynamic drag device connected to a rearward portion of the launch vehicle is of a selected size so that the launch vehicle pitch rate rotation approaches zero as the launch vehicle attitude approaches vertical.

* * * * *